United States Patent
Zhao et al.

(10) Patent No.: US 12,330,086 B2
(45) Date of Patent: Jun. 17, 2025

(54) SEPARATION TOWER AND METHOD FOR TREATING CONDENSED WATER

(71) Applicant: TIANHUA INSTITUTE OF CHEMICAL MACHINERY AND AUTOMATION CO., LTD, Lanzhou (CN)

(72) Inventors: Xu Zhao, Gansu (CN); Tao Zhou, Gansu (CN); Yuanrui Lu, Gansu (CN); Xiangnan Zhai, Gansu (CN); Yongpeng Tan, Gansu (CN); Yan Gao, Gansu (CN); Yipeng Zhang, Gansu (CN); Kaixuan Ma, Gansu (CN); Xiaoling Xie, Gansu (CN)

(73) Assignee: TIANHUA INSTITUTE OF CHEMICAL MACHINERY AND AUTOMATION CO., LTD, Lanzhou (CN)

( * ) Notice: Subject to any disclaimer, the term of this patent is extended or adjusted under 35 U.S.C. 154(b) by 0 days.

(21) Appl. No.: 17/912,752

(22) PCT Filed: May 16, 2022

(86) PCT No.: PCT/CN2022/092928
§ 371 (c)(1),
(2) Date: Jun. 15, 2023

(87) PCT Pub. No.: WO2023/103284
PCT Pub. Date: Jun. 15, 2023

(65) Prior Publication Data
US 2023/0398466 A1    Dec. 14, 2023

(30) Foreign Application Priority Data
Dec. 7, 2021    (CN) .......................... 20111482856.3

(51) Int. Cl.
*B01D 3/10* (2006.01)
*B01D 1/26* (2006.01)
(Continued)

(52) U.S. Cl.
CPC ............... *B01D 1/26* (2013.01); *B01D 1/305* (2013.01); *B01D 3/10* (2013.01); *B01D 3/324* (2013.01)

(58) Field of Classification Search
CPC ............ B01D 1/26; B01D 1/305; B01D 3/10; B01D 3/324
See application file for complete search history.

(56) References Cited

U.S. PATENT DOCUMENTS 3,231,251 A * 1/1966 Scheibel .................. B01D 3/22
                                                  422/255
3,499,827 A * 3/1970 Cox .......................... C02F 1/08
                                                  159/13.1

(Continued)

*Primary Examiner* — Jonathan Miller
(74) *Attorney, Agent, or Firm* — MUNCY, GEISSLER, OLDS & LOWE, P.C.

(57) ABSTRACT

Provided are a separation tower and method for treating condensed water. In order to overcome the defects that an apparatus has high investment and energy consumption and requires high safety due to the need to use an organic phase as an extractant, the present disclosure provides a separation tower for treating condensed water. The water separation tower includes a tower body. Evaporation units for purifying the condensed water are disposed in the tower body. A final-effect condensation unit is disposed below the evaporation units and connected with a vacuum pump. The present disclosure has the following beneficial effects: 1) the gravity is used, thereby omitting an intermediate pump and saving the power cost and a matching control system; 2) a pressure difference between every two effect evaporation units is designed, and heat energy provided by a first-effect evaporation unit is continuously evaporated to achieve separation, so that subsequent effect evaporation units do not require external heat sources; and 3) the degree of integration is high, the sealing property is good, a vacuum is easy to realize, a subsequent vacuum system is small, the energy consumption is low, a device is small in occupied area, the construction and installation cost is low, and the operation is simple.

8 Claims, 1 Drawing Sheet

(51) Int. Cl.
 _B01D 1/30_ (2006.01)
 _B01D 3/32_ (2006.01)

(56) References Cited

U.S. PATENT DOCUMENTS

| | | | | |
|---|---|---|---|---|
| 4,488,934 | A * | 12/1984 | Silvis | B01D 3/40 |
| | | | | 202/175 |
| 5,094,721 | A * | 3/1992 | Petrek | B01D 1/26 |
| | | | | 203/25 |
| 5,968,312 | A * | 10/1999 | Sephton | B01D 3/42 |
| | | | | 203/1 |
| 7,648,128 | B2 * | 1/2010 | Lee | B01D 3/20 |
| | | | | 261/114.5 |
| 9,745,208 | B2 * | 8/2017 | Al-Qutub | B01D 3/346 |
| 9,855,515 | B2 * | 1/2018 | Katyal | B01D 3/42 |
| 10,183,234 | B2 * | 1/2019 | Blaschke | B01F 23/2322 |
| 10,933,344 | B2 * | 3/2021 | Xu | B01D 3/326 |
| 11,547,952 | B1 * | 1/2023 | Xie | B01D 3/18 |
| 11,786,855 | B2 * | 10/2023 | Xu | B01D 46/0009 |
| | | | | 261/97 |
| 2004/0099970 | A1 * | 5/2004 | Zich | B01D 3/12 |
| | | | | 261/114.5 |
| 2015/0001038 | A1 * | 1/2015 | Katyal | B01D 3/42 |
| | | | | 261/36.1 |
| 2019/0299120 | A1 * | 10/2019 | Xu | B01D 3/26 |
| 2023/0398466 | A1 * | 12/2023 | Zhao | B01D 1/26 |

* cited by examiner

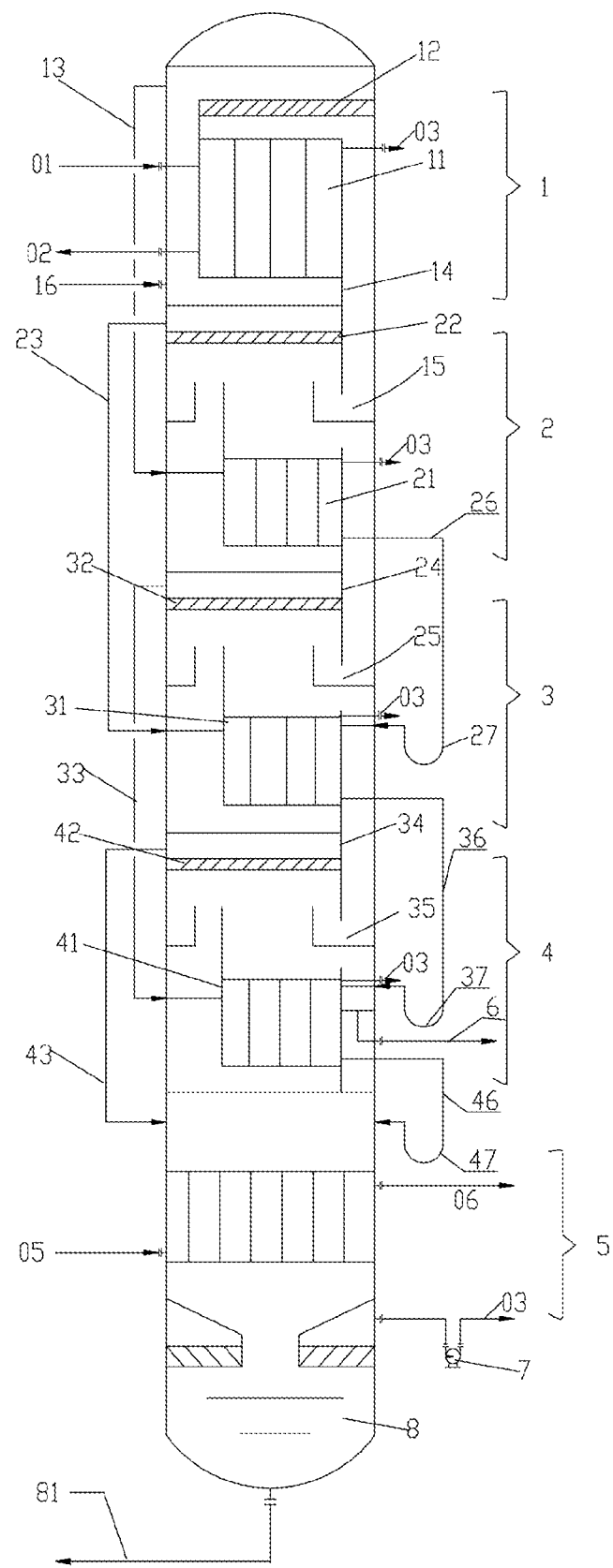

SEPARATION TOWER AND METHOD FOR TREATING CONDENSED WATER

TECHNICAL FIELD

The present disclosure relates to a water separation tower, in particular to a water separation tower for purifying condensed water of tail gas in a short-flow process of purified terephthalic acid (PTA for short).

BACKGROUND

Water circulation in a production process of a PTA apparatus is the key to realize a short-flow process. Vapor and oxidized tail gas discharged from a dehydration tower enter a condenser to be condensed to produce a large amount of condensed water. The condensed water contains a certain amount of acetic acid and p-toluic (PT) acid, which impact the recycling of the condensed water. The acetic acid in the condensed water will lead to aggravated corrosion of a refining unit, and under the condition that the condensed water is used as water for washing the refining unit, the PT acid will affect the quality of products. In order to improve the quality of the condensed water in the existing short-flow process, an extraction apparatus is generally used, which has high investment and energy consumption and requires high safety due to the need to use an organic phase as an extractant.

SUMMARY

In view of the problems existing in the above-mentioned treatment technology, the present disclosure provides a novel tower-type water separation tower with low energy consumption, high efficiency and intrinsic safety, and a separation method thereof.

Provided is a separation tower for treating condensed water, the water separation tower including a tower body, wherein evaporation units for purifying the condensed water are disposed in the tower body, and a final-effect condensation unit is disposed below the evaporation units and connected with a vacuum pump;

the evaporation units include a first-effect evaporation unit and a second-effect evaporation unit, or more effect evaporation units, such as a third, fourth or fifth-effect evaporation unit; the first-effect evaporation unit includes a condensed water inlet and a first heat exchange chamber, an upper portion of the first heat exchange chamber is provided with a first demister for demisting a vapor phase generated after heat exchange of the condensed water and a first downcomer for a liquid phase to flow to a next effect evaporation unit, the first demister communicates with a first vapor passage for a vapor phase to enter the next effect evaporation unit, and the bottom of the first downcomer is provided with a first concentric-square-shaped apparatus; the second-effect evaporation unit includes a second heat exchange chamber, an upper portion of the second heat exchange chamber is provided with a second demister for demisting a vapor phase generated after heat exchange of the condensed water and a second downcomer for a liquid phase to pass through, the second demister communicates with a second vapor passage, and the bottom of the second downcomer is provided with a second concentric-square-shaped apparatus; and a lower portion of the second heat exchange chamber is provided with a first condensed liquid channel for a condensed liquid after heat exchange to flow to the next effect evaporation unit, and the bottom of the first condensed liquid channel is provided with a first U-shaped tube.

The first concentric-square-shaped apparatus is located between the second heat exchange chamber and the second demister to isolate the first-effect evaporation unit from the second-effect evaporation unit to cause a pressure difference between the two. Meanwhile, the first concentric-square-shaped apparatus is also a spontaneous evaporation apparatus. Likewise, the second concentric-square-shaped apparatus and concentric-square-shaped apparatuses of other effect evaporation units are spontaneous evaporation apparatuses.

In addition to leading the condensed liquid to the bottom of the tower, the first U-shaped tube, like the concentric-square-shaped apparatus, may also isolate each effect evaporation unit from the next effect evaporation unit to cause a pressure difference between the two.

The first-effect evaporation unit is provided with a heat source from the outside. The heat source may be low-pressure vapor of 0.05-0.5 MPa as a heating medium, or a non-clean heat source such as industrial waste heat or the like may also be used.

Further, a purified water storage area is further disposed below the final-effect condensation unit.

Further, the condensed water inlet is formed in a lower portion of the first-effect condensation unit.

Further, the external heat source is provided by hot vapor outside a heat exchange pipeline leading into the first heat exchange chamber.

An objective of the present disclosure is further to provide a method for treating condensed water, including the following steps:

1) turning on a vacuum pump, injecting condensed water into a first-effect evaporation unit through a condensed water inlet, and introducing a heat source for heat exchange into the outside of a pipeline in a first heat exchange chamber.

2) enabling the condensed water and the heat source to exchange heat in the first heat exchange chamber, dividing the condensed water into a first vapor phase and a first liquid phase, enabling the first vapor phase to enter a first vapor passage after the first vapor phase passes through a first demister and to enter a next effect evaporation unit through the first vapor passage, enabling the first liquid phase to flow from a first downcomer to the next effect evaporation unit through a first concentric-square-shaped apparatus to become a first concentrated liquid phase that will be spontaneously evaporated in the first concentric-square-shaped apparatus, then enabling a generated vapor phase to enter a second demister and then enter a second vapor passage, and enabling the liquid phase that is not spontaneously evaporated to enter a heat exchange chamber of the next effect evaporation unit to exchange heat.

In this step, a first concentrated liquid is firstly collected in the first concentric-square-shaped apparatus during the downward flow. Under the condition that the first concentrated liquid is collected to a certain extent, the first-effect evaporation unit and a second-effect evaporation unit will be isolated. Since the vacuum pump is always working, a pressure difference will be formed between the first-effect evaporation unit and the second-effect evaporation unit, which will cause the pressure of the first concentric-square-shaped apparatus at an inlet of the first-effect evaporation unit to be higher than the pressure thereof at an outlet of the second-effect evaporation unit. Therefore, the first liquid phase will be spontaneously evaporated at the outlet of the second-effect evaporation unit.

The heat exchange is completed between the high-temperature heat source outside the pipeline in the corresponding heat exchange chamber and the low-temperature liquid phase inside the pipeline.

3) enabling the first vapor phase to enter the outside of a pipeline in a second heat exchange chamber through the first vapor passage to exchange heat with the first concentrated liquid phase as a heat source for second heat exchange, after heat exchange, condensing the first vapor phase into a condensed liquid and enabling the condensed liquid to flow downwards from a first condensed liquid channel into a first U-shaped tube, performing second heat exchange on a first concentrated liquid to obtain a second vapor phase and a second liquid phase, enabling the second vapor phase to enter a second vapor passage upwards through a second demister and then enter the next effect evaporation unit to exchange heat as the heat source or a final-effect condensation unit, and enabling the second liquid phase to enter a second concentric-square-shaped apparatus through a second downcomer and flow to the next effect evaporation unit or to be spontaneously evaporated.

In this process, under the condition that a first condensed liquid flows down into the first U-shaped tube, it will also be firstly collected in the first U-shaped tube. Under the condition that it is collected to a certain extent, the second-effect evaporation unit and the next effect evaporation unit will be isolated to form a pressure difference.

4) finally, enabling the vapor phase to enter the final-effect condensation unit to be condensed and mixed with the condensed liquid to become pure water to be discharged, while discharging concentrated water left after multi-effect evaporation for another treatment, and finally separating the pure water from other substances.

In addition to the first-effect evaporation unit, the subsequent evaporation units may not need external heat sources for second heat exchange.

Preferably, a third-effect evaporation unit may also be disposed. The third-effect evaporation unit includes a third heat exchange chamber. A third vapor phase outlet and a third liquid phase outlet are formed in an upper portion of the third heat exchange chamber. A third demister is disposed above the third vapor phase outlet and communicates with a third vapor passage. The third liquid phase outlet communicates to a third downcomer. The bottom of the third downcomer is provided with a third concentric-square-shaped apparatus. The bottom of the third heat exchange chamber is connected with a second condensed liquid channel leading to an upper portion of a fourth heat exchange chamber. An end of the second vapor passage communicates to the third heat exchange chamber. An outlet of the second concentric-square-shaped apparatus is located above the third heat exchange chamber. The bottom of the second condensed liquid channel is provided with a second U-shaped tube. A condensed liquid remaining in the second U-shaped tube will isolate the third-effect evaporation unit from a fourth-effect evaporation unit and cause a pressure difference between the two.

The third-effect evaporation unit has the same separation principle of vapor and liquid phases as the second-effect evaporation unit.

Preferably, a fourth-effect evaporation unit may also be disposed. The fourth-effect evaporation unit includes a fourth heat exchange chamber. A fourth vapor phase outlet and a concentrated water outlet are formed in an upper portion of the fourth heat exchange chamber. A fourth demister is disposed above the fourth vapor phase outlet and communicates with a fourth vapor passage. Concentrated water left after continuous evaporation may flow out of the concentrated water outlet. The bottom of the fourth heat exchange chamber is connected with a third condensed liquid channel leading to the final-effect condensation unit. The bottom of the third condensed liquid channel is provided with a third U-shaped tube. A condensed liquid remaining in the third U-shaped tube will isolate the fourth-effect evaporation unit from the final-effect condensation unit and cause a pressure difference between the two.

During the purification, the vacuum pump at the bottom of the tower is always working. In combination with the isolation effect of the U-shaped tube and the concentric-square-shaped apparatus between every two evaporation units, the pressure in the tower will gradually decrease from top to bottom, and the vacuum degree will gradually increase from top to bottom, which will lead to the pressure difference between every two effect evaporation units. The pressure difference will also increase the speed of evaporation. Meanwhile, the effect of gravity is also used herein, and the entire purification process proceeds from top to bottom and layer by layer.

During the purification, $H_2O$ is continuously evaporated into the vapor phase in each effect evaporation unit, then enters the next effect evaporation unit through the vapor passage, and also takes away heat for heat exchange of the next effect evaporation unit and the liquid phase. The condensed liquid after the heat exchange flows down through the condensed liquid channel and finally reaches the final-effect condensation unit to finally become the pure water to be discharged. Therefore, during the evaporation of each effect evaporation unit, the water (having an atmospheric boiling point of 100° C.) is continuously evaporated into the vapor phase, and other substances such as acetic acid (having an atmospheric boiling point of 117.9° C.) and PT acid (having an atmospheric boiling point of 274-275° C.) will be left for continuous concentration and finally become the concentrated water to be discharged.

Of course, other chemical substances may also need to be subjected to the treatment of the condensed water in the production process, to which the apparatus and method are also applicable.

The present disclosure has the beneficial effects that: 1) the gravity is used, and the vapor and liquid phases enter the effect evaporation units downwards stage by stage by means of the gravity, thereby omitting an intermediate pump and saving the power cost and a matching control system; 2) a pressure difference between every two effect evaporation units is ingeniously designed, and heat energy provided by the first-effect evaporation unit is continuously evaporated to achieve separation, so that the subsequent effect evaporation units do not require external heat sources; and 3) the pipelines between all the units are all disposed in the tower, and there are no pipelines disposed outside the tower, so that the degree of integration is high, the sealing property is good, a vacuum is easy to realize, a subsequent vacuum system is small, the energy consumption is low, a device is small in occupied area, the construction and installation cost is low, and the operation is simple.

BRIEF DESCRIPTION OF THE DRAWINGS

The sole FIGURE is a structural schematic diagram of the present disclosure.

DETAILED DESCRIPTION OF THE EMBODIMENTS

The present disclosure is further explained and described below with reference to the accompanying drawing.

Referring to the sole FIGURE, in this embodiment, a water separation tower includes a total of four-effect evaporation units.

Provided is a water separation tower for treating condensed water in a preparation process of purified terephthalic acid. The water separation tower includes a tower body, a first-effect evaporation unit 1 for purifying the condensed water, a second-effect evaporation unit 2 disposed below the first-effect evaporation unit 1, a third-effect evaporation unit 3 disposed below the second-effect evaporation unit 2, a fourth-effect evaporation unit 4 disposed at the bottom of the third-effect evaporation unit 3, and a final-effect condensation unit 5 disposed below the fourth-effect evaporation unit 4, wherein the first-effect evaporation unit, the second-effect evaporation unit, the third-effect evaporation unit and the fourth-effect evaporation unit are disposed in the tower body and arranged in sequence from top to bottom. In order to maintain the sealing property of the tower body, each of the top and bottom of the tower body is provided with a seal head.

Each effect evaporation unit is provided with a non-condensable gas outlet 03 to prepare for the discharge of non-condensable gas, which is used to adjust the gas pressure in each effect evaporation unit in the tower when necessary.

An isolation plate is disposed between every two effect evaporation units to perform isolation.

The first-effect evaporation unit 1 includes a first heat exchange chamber 11. A first vapor phase outlet and a first liquid phase outlet are formed in an upper portion of the first heat exchange chamber 11. A first demister 12 is disposed above the first vapor phase outlet. The first demister 12 communicates with a first vapor passage 13 (the first vapor passage 13 is preferably located in the tower). The first liquid phase outlet communicates to a first downcomer 14. The bottom of the first downcomer 14 is provided with a first concentric-square-shaped apparatus 15. The bottom of the first-effect evaporation unit 1 is provided with a condensed water inlet 16.

Preferably, the first-effect evaporation unit 1 is provided with a vapor inlet 01 and a vapor outlet 02 for providing a heat source to the first-effect evaporation unit 1 to complete heat exchange. The heat source may be low-pressure vapor of 0.05-0.5 MPa as a heating medium, or a non-clean heat source such as industrial waste heat or the like may also be used.

During the purification of the first-effect evaporation unit 1, the condensed water to be purified enters the bottom of the first-effect evaporation unit 1 from the condensed water inlet 16, and then exchanges heat in the first heat exchange chamber 11. After heat exchange, a part of the condensed water becomes a first vapor phase, enters the first vapor passage 13 from the first vapor phase outlet through the first demister 12 and enters the second-effect evaporation unit 2 through the first vapor passage 13 to serve as a heat source for heat exchange of the next effect evaporation unit, and the other part of the condensed water that is not converted into the vapor phase enters the first downcomer 14 from the first liquid phase outlet in the form of a first liquid phase and then flows into the second-effect evaporation unit 2 through the first concentric-square-shaped apparatus 15 to become a first concentrated liquid. A first concentrated liquid phase will be partially spontaneously evaporated in the first concentric-square-shaped apparatus 15 and then enters a second vapor passage 23 through a second demister 22, and the part of the first concentrated liquid phase that is not spontaneously evaporated will enter the next effect evaporation unit to exchange heat.

In the above process, hot vapor enters a pipeline of the first heat exchange chamber 11 from the vapor inlet 01 to exchange heat with the condensed water, and the cooled vapor after heat exchange is discharged from the vapor outlet 02, wherein the temperature of the first-effect evaporation unit 1 is about 100° C. (95-105° C.), and the pressure of the first-effect evaporation unit 1 is equivalent to the external pressure.

The second-effect evaporation unit 2 includes a second heat exchange chamber 21. A second vapor phase outlet and a second liquid phase outlet are formed in an upper portion of the second heat exchange chamber 21. A second demister 22 is disposed above the second vapor phase outlet. The second demister 22 communicates with a second vapor passage 23 (preferentially located in the tower). The second liquid phase outlet communicates to a second downcomer 24. The bottom of the second downcomer 24 is provided with a second concentric-square-shaped apparatus 25. The bottom of the second heat exchange chamber 21 is connected with a first condensed liquid channel 26 (preferentially located in the tower) leading to an upper portion of a third heat exchange chamber 31. The bottom of the first condensed liquid channel 26 is provided with a first U-shaped tube 27. A condensed liquid remaining in the first U-shaped tube 27 will isolate the second-effect evaporation unit 2 from the third-effect evaporation unit 3 and cause a pressure difference between the two. An end of the first vapor passage 13 communicates to the second heat exchange chamber 21. An outlet of the first concentric-square-shaped apparatus 15 is located above the second heat exchange chamber 21.

The first liquid phase stays in the first concentric-square-shaped apparatus 15. Under the condition that the first liquid phase is collected to a certain extent, it will isolate the first-effect evaporation unit 1 from the second-effect evaporation unit 2, so that there is a certain pressure difference (the bottom of the tower is connected with a vacuum pump) between the first-effect evaporation unit 1 and the second-effect evaporation unit 2. The pressure in the second-effect evaporation unit 2 will be lower than the pressure in the first-effect evaporation unit 1, so that the pressure of the first concentric-square-shaped apparatus 15 at an outlet of the second-effect evaporation unit 2 will be lower than the pressure thereof at an inlet in the first-effect evaporation unit 1 (that is, the liquid phase in the first concentric-square-shaped apparatus 15 has a pressure difference between the inlet and the outlet). Therefore, the first concentric-square-shaped apparatus 15 is also a spontaneous evaporation apparatus, and will perform spontaneous evaporation with the pressure difference. The first liquid phase, during the spontaneous evaporation, will be divided into two phases again, namely, a first spontaneously evaporated vapor phase in a gas state and a first concentrated liquid phase. The first spontaneously evaporated vapor phase enters the second demister 22 upwards, enters the second vapor passage 23 through the second demister 22 and then enters the third-effect evaporation unit 3. The first concentrated liquid phase flows down into the second heat exchange chamber 21. In the second heat exchange chamber 21, the first concentrated liquid phase and the first vapor phase exchange heat for the second time (the temperature of the first vapor phase is higher than the temperature of the first concentrated liquid phase), and the first concentrated liquid phase is divided into a vapor phase and a liquid phase again, namely, a second vapor phase and a second liquid phase, wherein the second vapor phase passes through the second demister 22 upwards, enters the second vapor passage 23 through the second demister 22 and then enters the third-effect evaporation unit 3 to exchange heat as a heat source, while the second liquid phase enters the second concentric-square-shaped apparatus 25 through the second downcomer 24 to be spontaneously evaporated.

During the purification of the second-effect evaporation unit 2, the first vapor phase enters a pipeline in the second heat exchange chamber 21 through the first vapor passage 13. After second heat exchange in the second heat exchange chamber 21, the first vapor phase is cooled to become a first condensed liquid. The first condensed liquid flows down from the first condensed liquid channel 26. During the downward flow, the condensed liquid will first fill the first U-shaped tube 27 at the bottom of the first condensed liquid channel 26 to isolate the second-effect evaporation unit 2 from the third-effect evaporation unit and cause a pressure difference between the two.

The second-effect evaporation unit 2 may perform second heat exchange without an external heat source. A heat source in the second heat exchange is provided by the first vapor phase from the first-effect evaporation unit, and heat flows from the first vapor phase to the first concentrated liquid phase.

The temperature of the second-effect evaporation unit 2 is about 80° C. (75-90° C.), and the pressure of the second-effect evaporation unit 2 is about 0.038-0.07 MPa.

Likewise, the third-effect evaporation unit 3 includes a third heat exchange chamber 31. A third vapor phase outlet and a third liquid phase outlet are formed in an upper portion of the third heat exchange chamber 31. A third demister 32 is disposed above the third vapor phase outlet. The third demister 32 communicates with a third vapor passage 33 (preferentially located in the tower). The third liquid phase outlet communicates to a third downcomer 34. The bottom of the third downcomer 34 is provided with a third concentric-square-shaped apparatus 35. The bottom of the third heat exchange chamber 31 is connected with a second condensed liquid channel 36 leading to an upper portion of a heat exchange chamber of the next effect evaporation unit. An end of the second vapor passage 23 communicates to the third heat exchange chamber 31. An outlet of the second concentric-square-shaped apparatus 25 is located above the third heat exchange chamber 31 and below the third demister 32. The bottom of the second condensed liquid channel 36 is provided with a second U-shaped tube 37. A condensed liquid remaining in the second U-shaped tube 37 will isolate the second-effect evaporation unit 2 from the third-effect evaporation unit 3 and cause a pressure difference between the two. Likewise, the bottom of the second condensed liquid channel 36 is also provided with the second U-shaped tube 37, and the second U-shaped pipe 37 has the same function as the first U-shaped pipe 27.

The third-effect evaporation unit 3 has the same separation principle of vapor and liquid phases as the second-effect evaporation unit 2. The third-effect evaporation unit 3 may also perform third heat exchange without an external heat source, and has the same heat exchange direction as the second-effect evaporation unit 2.

The temperature of the third-effect evaporation unit 3 is about 60° C. (55-80° C.), and the pressure of the third-effect evaporation unit 3 is about 0.02-0.047 MPa.

Like the third-effect evaporation unit 3, the fourth-effect evaporation unit 4 includes a fourth heat exchange chamber 41. A fourth vapor phase outlet and a concentrated water outlet are formed in an upper portion of the fourth heat exchange chamber 41. A fourth demister 42 is disposed above the fourth vapor phase outlet. The fourth demister 42 communicates with a fourth vapor passage 43. Concentrated water left after continuous evaporation may flow out of the concentrated water outlet 6. The bottom of the fourth heat exchange chamber 41 is connected with a third condensed liquid channel 46 leading to the final-effect condensation unit 5. The bottom of the third condensed liquid channel 46 is provided with a third U-shaped tube 47. The third U-shaped tube 47 has the same function as the U-shaped tube of the previous effect evaporation unit.

The temperature of the fourth-effect evaporation unit 4 is about 45° C. (40-70° C.), and the pressure of the fourth-effect evaporation unit 4 is about 0.007-0.03 MPa.

During the purification, the vacuum pump 7 at the bottom of the tower is always working to adjust the pressure of each effect evaporation unit. The pressure in the tower gradually decreases from bottom to top, the vacuum degree gradually increases from top to bottom, and the U-shaped tubes and the concentric-square-shaped apparatuses have the isolation effect, which will lead to the pressure difference between every two effect evaporation units. The pressure difference will also increase the speed of evaporation. Meanwhile, the effect of gravity is also used herein, and the entire purification process proceeds from top to bottom and layer by layer.

During the purification, $H_2O$ is continuously evaporated, then enters the next effect evaporation unit through the vapor passage, and also takes away heat for heat exchange of the next effect evaporation unit and the liquid phase. A part of condensed $H_2O$ finally flows into the final-effect condensation unit 5 through the condensed liquid channel, while a part that is not condensed continues to enter the next effect evaporation unit for heat exchange and finally enters the final-effect condensation unit 5 through the fourth vapor passage 43 to be condensed into pure water to be discharged, and the concentrated water after multi-time evaporation is discharged through the concentrated water outlet for another treatment. The final-effect condensation unit 5 is provided with a cooling water inlet 05 and a cooling water outlet 06, and is configured for cooling by heat exchange with pure water vapor. The cooling water inlet 05 is formed in the bottom of the final-effect condensation unit 5, and the cooling water outlet 06 is formed in the top of the final-effect condensation unit 5.

A purified water storage tank 8 is disposed at the bottom of the tower, and a purified water outlet 81 is formed in the bottom of the purified water storage tank 8.

The composition of the four-effect evaporation units provided by the above embodiment, in actual operation, may be any one of multi-effect solutions such as 2, 3, 4, 5 and the like.

The invention claimed is:

1. A separation tower for treating condensed water, the water separation tower comprising a tower body, wherein evaporation units for purifying the condensed water are disposed in the tower body, and a final-effect condensation unit is disposed below the evaporation units and connected with a vacuum pump;

the evaporation units comprise a first-effect evaporation unit and a second-effect evaporation unit; the first-effect evaporation unit comprises a condensed water inlet and a first heat exchange chamber, the condensed water inlet is disposed at a bottom portion of the first-effect evaporation unit, an upper portion of the first heat exchange chamber is connected with a first vapor passage for a vapor phase to enter a next effect evaporation unit and a first downcomer for a liquid phase to flow to the next effect evaporation unit, and a bottom of the first downcomer is provided with a first loop-shaped apparatus;

the second-effect evaporation unit comprises a second heat exchange chamber, an upper portion of the second heat exchange chamber is provided with a second vapor passage for a vapor phase to pass through after heat exchange of the condensed water and a second downcomer for a liquid phase to pass through, and a bottom of the second downcomer is provided with a second loop-shaped apparatus;

a lower portion of the second heat exchange chamber is provided with a first condensed liquid channel for a condensed liquid after heat exchange to flow to the next effect evaporation unit, and the bottom of the first condensed liquid channel is provided with a first U-shaped tube; and the first loop-shaped apparatus is located between the second heat exchange chamber and a second demister.

2. The separation tower for treating condensed water according to claim 1, wherein a purified water storage area is further disposed below the final-effect condensation unit.

3. The separation tower for treating condensed water according to claim 1, wherein a third-effect evaporation unit is further disposed below the second-effect condensation unit.

4. The separation tower for treating condensed water according to claim 3, wherein a fourth-effect evaporation unit is further disposed below the third-effect condensation unit.

5. The separation tower for treating condensed water according to claim 1, wherein the condensed water inlet is formed in a lower portion of the first-effect condensation unit.

6. The separation tower for treating condensed water according to claim 1, wherein an external heat source is provided by hot vapor outside a heat exchange pipeline leading into the first heat exchange chamber.

7. The separation tower for treating condensed water according to claim 1, wherein demisters for demisting the vapor phases generated after heat exchange of the condensed water are further disposed between the upper portions of the heat exchange chambers and the vapor passages.

8. A method for treating condensed water, comprising the following steps:

1) turning on a vacuum pump, injecting condensed water into a first-effect evaporation unit through a condensed water inlet, and introducing a heat source for heat exchange into the outside of a pipeline in a first heat exchange chamber, wherein the condensed water inlet is disposed at a bottom portion of the first-effect evaporation unit;

2) enabling the condensed water and the heat source to exchange heat in the first heat exchange chamber, dividing the condensed water into a first vapor phase and a first liquid phase, enabling the first vapor phase to enter a first vapor passage after the first vapor phase passes through a first demister and to enter a next effect evaporation unit through the first vapor passage, and enabling the first liquid phase to flow from a first downcomer to the next effect evaporation unit through a first loop-shaped apparatus to become a first concentrated liquid phase or to be spontaneously evaporated in the first loop-shaped apparatus;

3) enabling the first vapor phase to enter the outside of a pipeline in a second heat exchange chamber through the first vapor passage to exchange heat with the first concentrated liquid phase as a heat source for second heat exchange, after heat exchange, condensing the first vapor phase into a condensed liquid and enabling the condensed liquid to flow downwards from a first condensed liquid channel into a first U-shaped tube, performing second heat exchange on the first concentrated liquid to obtain a second vapor phase and a second liquid phase, enabling the second vapor phase to enter a second vapor passage upwards through a second demister and then enter the next effect evaporation unit or a final-effect condensation unit, and enabling the second liquid phase to enter a second apparatus through a second downcomer and flow to the next effect evaporation unit or to be spontaneously evaporated; and enabling the vapor phase to enter the final-effect condensation unit to be condensed and mixed with the condensed liquid to become pure water to be discharged, while discharging concentrated water left after multi-effect evaporation.

* * * * *